(12) United States Patent
Jan

(10) Patent No.: US 9,116,284 B2
(45) Date of Patent: Aug. 25, 2015

(54) MATERIAL FOR MANUFACTURING CONTACT LENS, METHOD FOR MANUFACTURING CONTACT LENS AND CONTACT LENS MANUFACTURED THEREFORM

(71) Applicant: BenQ Materials Corporation, Taoyuan County (TW)

(72) Inventor: Fan-Dan Jan, Taoyuan County (TW)

(73) Assignee: BENQ MATERIALS CORPORATIONS, Taoyuan (TW)

( * ) Notice: Subject to any disclaimer, the term of this patent is extended or adjusted under 35 U.S.C. 154(b) by 245 days.

(21) Appl. No.: 13/916,609

(22) Filed: Jun. 13, 2013

(65) Prior Publication Data

US 2014/0213685 A1 Jul. 31, 2014

(30) Foreign Application Priority Data

Jan. 31, 2013 (TW) .............................. 102103648 A

(51) Int. Cl.
  *C08G 77/20* (2006.01)
  *G02B 1/04* (2006.01)
  *C08F 230/08* (2006.01)
  *C08L 83/08* (2006.01)
  *C08G 77/26* (2006.01)
  *C08G 77/388* (2006.01)

(52) U.S. Cl.
  CPC .............. *G02B 1/043* (2013.01); *C08F 230/08* (2013.01); *C08L 83/08* (2013.01); *C08G 77/20* (2013.01); *C08G 77/26* (2013.01); *C08G 77/388* (2013.01)

(58) Field of Classification Search
  None
  See application file for complete search history.

(56) References Cited

U.S. PATENT DOCUMENTS

| | | | |
|---|---|---|---|
| 6,750,309 B1 | 6/2004 | Chu et al. | |
| 6,867,245 B2 | 3/2005 | Iwata et al. | |
| 8,490,782 B2 * | 7/2013 | Zhao et al. | 206/5.1 |
| 2010/0258961 A1 * | 10/2010 | Chang et al. | 264/1.38 |
| 2011/0063567 A1 * | 3/2011 | Domschke et al. | 351/160 H |
| 2012/0118683 A1 | 5/2012 | Desbois-Renaudin et al. | |
| 2013/0056889 A1 * | 3/2013 | Jan | 264/1.1 |

FOREIGN PATENT DOCUMENTS

TW 201127881 A 8/2011
TW 201231511 A 8/2012

\* cited by examiner

*Primary Examiner* — Robert S Loewe
(74) *Attorney, Agent, or Firm* — CKC & Partners Co., Ltd.

(57) ABSTRACT

A material is provided for contact lens including a first siloxane macromer represented by the following formula (I):

formula (I)

$$CH_2=\underset{R_7}{\underset{|}{C}}-\underset{\underset{H}{|}}{\overset{O}{\overset{\|}{C}}}-R_6-\underset{\underset{H}{|}}{\overset{O}{\overset{\|}{C}}}-\underset{\underset{H}{|}}{\overset{R_5}{\overset{|}{C}}}-\underset{\underset{H}{|}}{\overset{}{N}}-R_4-\underset{\underset{R_1}{|}}{\overset{R_1}{\overset{|}{Si}}}-(O-\underset{\underset{R_2}{|}}{\overset{R_2}{\overset{|}{Si}}})_m-O-$$

$$-\underset{\underset{R_3}{|}}{\overset{R_3}{\overset{|}{Si}}}-R_4-\underset{\underset{H}{|}}{\overset{}{N}}-\underset{\underset{H}{|}}{\overset{O}{\overset{\|}{C}}}-\underset{\underset{H}{|}}{\overset{R_5}{\overset{|}{C}}}-R_6-\underset{}{\overset{O}{\overset{\|}{C}}}-\underset{R_7}{\overset{}{C}}=CH_2$$

wherein $R_1$, $R_2$ and $R_3$ are independently $C_1$-$C_{12}$ hydroxyl group, $C_1$-$C_{12}$ alkyl groups or $C_1$-$C_{12}$ siloxane group; $R_4$ is $C_1$-$C^6$ alkylene group or $C_1$-$C_6$ alkylene substituted with ether group; $R_5$ is —H, —$CH_3$, —$CH(CH_3)_2$, —$CH(CH_3)CH_2(CH_3)$, —$CH_2CH(CH_3)_2$, —$CH_2C_6H_5$, —$CH_2OH$, —$CH(OH)CH_3$, —$CH_2CONH_2$ or —$CH_2CH_2CONH_2$: $R_6$ is —NHCONH—, —NHCO—, —$R_8$NHCONH— or —$R_8$NHCO—, wherein $R_8$ is —O—, —$O(CH_2)_n$— or —$(CH_2)_n$— and n is an integer of 1-10; $R_7$ is hydrogen or methyl; and m is an integer of 10-100.

20 Claims, No Drawings

MATERIAL FOR MANUFACTURING CONTACT LENS, METHOD FOR MANUFACTURING CONTACT LENS AND CONTACT LENS MANUFACTURED THEREFROM

CROSS-REFERENCE TO RELATED APPLICATION

This application claims the priority benefit of Taiwan Application Serial No. 102103648, filed Jan. 31, 2013, the full disclosure of which is incorporated herein by reference.

BACKGROUND

1. Technical Field

The present invention relates to a material for manufacturing contact lens. More particularly, the present invention relates to a material for manufacturing contact lens comprising siloxane macromer with amino acid groups.

2. Description of Related Art

Hard contact lens was mainly made of glass. To improve the comfortability in wearing the contact lens, soft contact lens was then developed. The soft contact lens normally can be categorized into hydrogel contact lens and silicon hydrogel contact lens.

The hydrogel contact lens is made from hydrogel materials, such as poly-2-hydroxyethyl methacrylate (p-HEMA). Since the water content of the p-HEMA is only about 38.8%, the hydrophilic monomer, for example N-vinylpyrrolidone (NVP), N,N-dimethylacrylamide (DMA) and methyl acrylic acid (MAA), is added thereinto to improve the water content of such materials for the contact lens. With the addition of the hydrophilic monomer, the water content of the contact lens can reach up to 80%. However, the higher water content of the contact lens is, the lower tension and toughness thereof become. In this regard, the water content of contact lens generally ranges from about 45% to 58%, but the real oxygen permeability still ranges from about 15 to 35% regardless the increment in the water content.

In recent years, silicone hydrogel contact lens has been developed to improve the disadvantages of the hydrogel contact lens. Silicone hydrogel contact lens has better oxygen permeability than the hydrogel contact lens. The silicone hydrogel contact lens includes a silicone polymeric material and a hydrophilic monomer, and is formed by the polymerization thereof.

However, because of the hydrophobic nature on the surface of silicone hydrogel contact lens, someone may feel uncomfortable when wearing the contact lenses. Therefore, there is a need to provide a novel material for manufacturing contact lens with higher oxygen permeability (DK), higher water content and better comfortability of wearing and a method for manufacturing contact lens by using the same.

SUMMARY

The present invention is to provide a material for manufacturing contact lens comprising siloxane macromer with amino acid groups such as glycine group, alanine group, valine group, isolucine group, leucine group, phenylalanine group, serine group, threonine group, asparagines group or glutamine group. The oxygen permeability (DK) and the water content of the contact lens formed of the composition comprising the present material can be enhanced, and wearers can feel more comfortable due to the amino acid groups which provide more hydrophilic and has better biocompatibility.

According to an aspect of the present invention, a material for manufacturing contact lens is provided.

In an embodiment of the present invention, the material for manufacturing contact lens comprises a first siloxane macromer represented by the following formula (I):

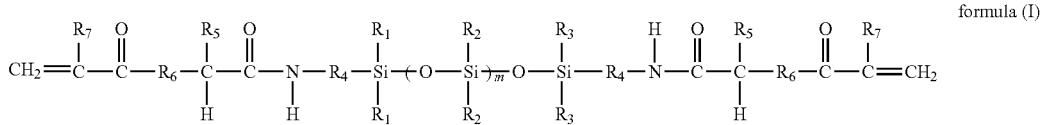

formula (I)

wherein $R_1$, $R_2$ and $R_3$ are independently $C_1$-$C_{12}$ hydroxyl group, $C_1$-$C_{12}$ alkyl groups or $C_1$-$C_{12}$ siloxane group; $R_4$ is $C_1$-$C_6$ alkylene group or $C_1$-$C_6$ alkylene substituted with ether group; $R_5$ is —H, —$CH_3$, —$CH(CH_3)_2$, —$CH(CH_3)CH_2(CH_3)$, —$CH_2CH(CH_3)_2$, —$CH_2C_6H_5$, —$CH_2OH$, —$CH(OH)CH_3$, —$CH_2CONH_2$ or —$CH_2CH_2CONH_2$; $R_6$ is —NHCONH—, —NHCO—, —$R_8$NHCONH— or —$R_8$NHCO—, wherein $R_8$ is —O—, —$O(CH_2)_n$— or —$(CH_2)_n$— and n is an integer of 1-10; $R_7$ is hydrogen or methyl; and m is an integer of 10-100.

According to a further aspect of the present invention, a method for manufacturing contact lens is provided.

In an embodiment of the method of the present invention, the method for manufacturing contact lens comprises: (a) mixing a first siloxane macromer represented by the following formula (I):

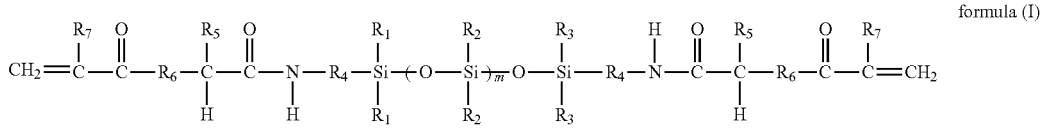

formula (I)

wherein $R_1$, $R_2$ and $R_3$ are independently $C_1$-$C_{12}$ hydroxyl group, $C_1$-$C_{12}$ alkyl groups or $C_1$-$C_{12}$ siloxane group; $R_4$ is $C_1$-$C_6$ alkylene group or $C_1$-$C_6$ alkylene substituted with ether group; $R_5$ is —H, —$CH_3$, —$CH(CH_3)_2$, —$CH(CH_3)CH_2(CH_3)$, —$CH_2CH(CH_3)_2$, —$CH_2C_6H_5$, —$CH_2OH$, —$CH(OH)CH_3$, —$CH_2CONH_2$ or —$CH_2CH_2CONH_2$; $R_6$ is —NHCONH—, —NHCO—, —$R_8$NHCONH— or —$R_8$NHCO—, wherein $R_8$ is —O—, —$O(CH_2)_n$— or —$(CH_2)_n$— and n is an integer of 1-10; R7 is hydrogen or methyl; and m is an integer of 10-100;

a second siloxane macromer represented by the following formula (II):

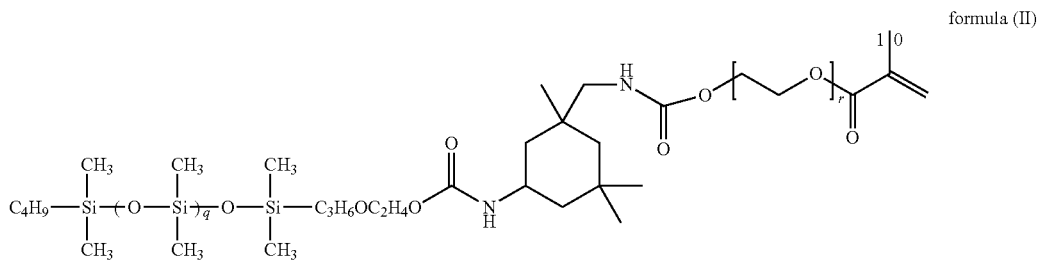

formula (II)

wherein q is an integer of 4-80 and r is an integer of 3-40; at least a hydrophilic monomer and an initiator to form a mixture; and (b) injecting the mixture into a mold of contact lens and conducting a thermal treatment or a UV irradiating treatment to form contact lens.

According to a further another aspect of the present invention, a contact lens obtained by the method mentioned above is provided.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, a material for manufacturing contact lens is provided. The material for manufacturing contact lens comprises a siloxane macromer with amino acid groups. The contact lens formed of the composition comprising the present material has better biocompatibility, excellent oxygen permeability and suitable water content, and thus, wearers can feel more comfortable thereby.

In an embodiment of the present invention, the material for manufacturing contact lens comprises a first siloxane macromer represented by the following formula (I):

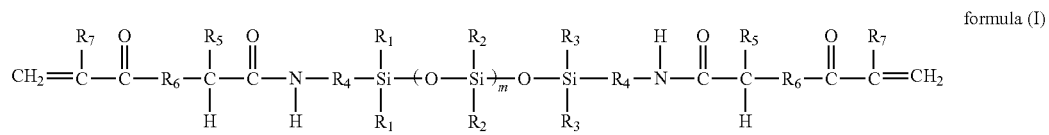

formula (I)

wherein $R_1$, $R_2$ and $R_3$ are independently $C_1$-$C_{12}$ hydroxyl group, $C_1$-$C_{12}$ alkyl groups or $C_1$-$C_{12}$ siloxane group; $R_4$ is $C_1$-$C_6$ alkylene group or $C_1$-$C_6$ alkylene substituted with ether group; $R_5$ is —H, —$CH_3$, —$CH(CH_3)_2$, —$CH(CH_3)CH_2(CH_3)$, —$CH_2CH(CH_3)_2$, —$CH_2C_6H_5$, —$CH_2OH$, —$CH(OH)CH_3$, —$CH_2CONH_2$ or —$CH_2CH_2CONH_2$; $R_6$ is —NHCONH—, —NHCO—, —$R_8$NHCONH— or —$R_8$NHCO—, wherein $R_8$ is —O—, —$O(CH_2)_n$— or —$(CH_2)$— and n is an integer of 1-10; $R_7$ is hydrogen or methyl; and m is an integer of 10-100.

In an embodiment of the first siloxane macromer of the present invention, R1, R2 and $R_3$ are methyl, $R_4$ is $C_3$ alkylene, $R_5$ is —H, $R_6$ is —$OC_2H_4$NHCONH— and $R_7$ is methyl as represented by the following formula (I-1):ke

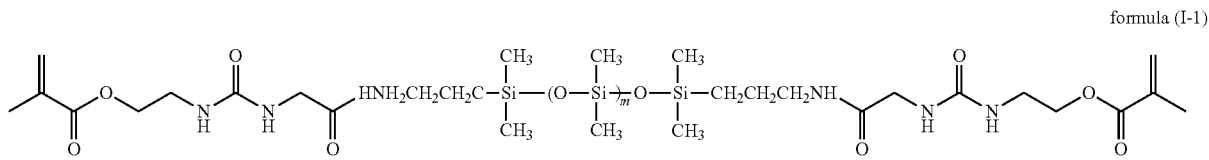

formula (I-1)

wherein m is an integer of 10-100.

In another embodiment of the first siloxane macromer of the present invention, $R_1$, $R_2$ and $R_3$ are methyl, $R_4$ is $C_3$ alkylene, $R_5$ is —$CH_3$, $R_6$ is —$OC_2H_4NHCONH$— and $R_7$ is methyl as represented by the following formula (I-2):

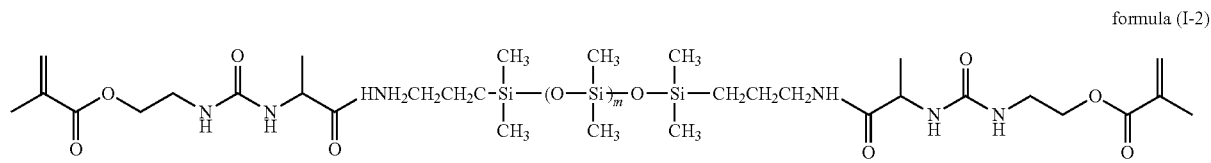

formula (I-2)

wherein m is an integer of 10-100.

In further another embodiment of the first siloxane macromer of the present invention, $R_1$, $R_2$ and $R_3$ are methyl, $R_4$ is $C_3$ alkylene, $R_5$ is —$CH_2OH$, R is —$OC_2H_4NHCONH$— and $R_7$ is methyl as represented by the following formula (I-3):

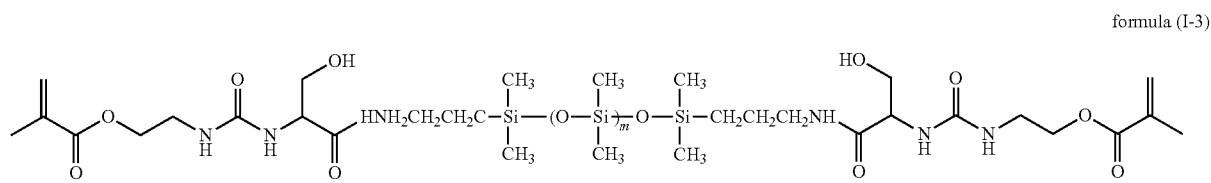

formula (I-3)

wherein m is an integer of 10-100.

Additionally, the material for manufacturing contact lens of the present invention further comprises a second siloxane macromer represented by the following formula (II), at least a hydrophilic monomer and an initiator:

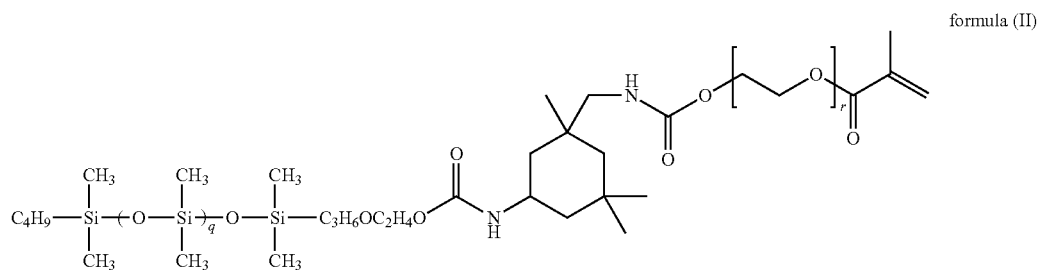

formula (II)

wherein q is an integer of 4-80 and r is an integer of 3-40.

In an embodiment of the present invention, the first siloxane monomer defined as above is present at an amount of 3 to 50 parts by weight, more to preferably at an amount of 3 to 30 parts by weight, the second siloxane monomer defined as above is present at an amount of 30 to 70 parts by weight, more preferably at an amount of 30 to 50 parts by weight, the hydrophilic monomer is present at an amount of 20 to 70 parts by weight, more preferably at an amount of 30 to 65 parts by weight, and the initiator is present at an amount of 0.1 to 1 parts by weight, more preferably at an amount of 0.5 to 0.7 parts by weight, based on the total amount of the material.

In addition, the hydrophilic monomer is selected from a group consisting of N-vinylpyrrolidone (NVP), 2-hydroxyethyl methacrylate (HEMA), N,N'-dimethylacrylamide (DMA), methyl acrylic acid (MAA), N,N-diethylacrylamide, N-isopropylacrlamide, 2-hydroxyethyl acrylate, vinyl acetate, N-acryloymorpholine, 2-dimethlaminoethyl acrylate and a combination thereof.

The initiator suitably used in conventional materials for contact lens can be used in the present invention. The initiator can be a photoinitiator or a thermal initiator. The suitable thermal initiator can be but not limited to, such as, for example, azobisisoheptonitrile (ADVN), 2,2'-azobis(isoheptonitrile) (AIBN), 2,2'-azobis(2,4-dimethylvaleronitrile), 2,2'-azobis(2-methyl-propanenitrile), 2,2'-azobis(2-methyl-butanenitrile) or benzoyl peroxide. The suitable photoinitiator can be but not limited to, such as, for example, 2,4,6-trimethylbenzoyl diphenyl oxide, 2-hydroxy-2-methylphenylpropane-1-one, ethyl (2,4,6-trimethylbenzoyl) phenylphosphinate or 2,2-diethoxyacetophenone.

In addition, the material for manufacturing contact lens can further comprise but not limited to a crosslinking agent, a dye, an UV-blocking agent, a solvent or a combination thereof. The suitable crosslinking agent can be but not limited to, such as, for example, ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate, vinyl methacrylate, ethylenediamine dimethyl acrylamide, glycerol dimethacrylate, triallyl isocyanurate and triallyl cyanurate. The suitable solvent can be but not limited to, such as, for example, ethanol or 1-hexanol. In the mentioned material, the solvent is present at an amount of 0 to 25 parts by weight, more preferably at an amount of 0 to 10 parts by weight based on the total amount of the material.

In an embodiment of the present invention, the material for manufacturing contact lens comprises a first siloxane macromer represented by the following formula (I-1) and a second siloxane macromer of formula (II) as defined above:

(DMA) or a combination of N-vinylpyrrolidone (NVP) and 2-hydroxyethyl methacrylate (HEMA).

According to a further aspect of the present invention, a method for manufacturing contact lens is provided. The present method can comprise but not limited to the following steps (a)-(b).

In the step of (a), a mixture is formed, wherein the mixture comprises a first siloxane macromer as defined above, a second siloxane macromer as defined above, at least one hydrophilic monomer and an initiator as mentioned above.

The first siloxane monomer defined as above is present at an amount of 3 to 50 parts by weight, more preferably at an amount of 3 to 30 parts by weight, the second siloxane mono-

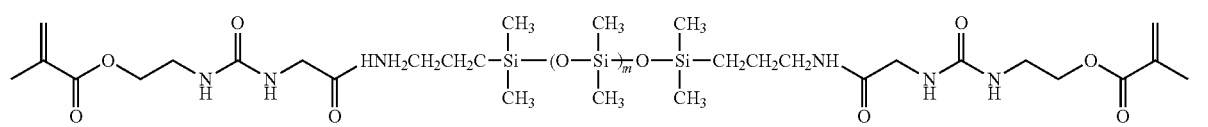

formula (I-1)

wherein m is an integer of 10-100.

In this embodiment, the hydrophilic monomer is a combination of N-vinylpyrrolidone (NVP), 2-hydroxyethyl methacrylate (HEMA) and dimethylaminoethyl methacrylate (DMA) or a combination of N-vinylpyrrolidone (NVP) and 2-hydroxyethyl methacrylate (HEMA).

In another embodiment of the present invention, the material for manufacturing contact lens comprises a first siloxane macromer represented by the following formula (I-2) and a second siloxane macromer of formula (II) as defined above:

mer defined as above is present at an amount of 30 to 70 parts by weight, more preferably at an amount of 30 to 50 parts by weight, the hydrophilic monomer is present at an amount of 20 to 70 parts by weight, more preferably at an amount of 30 to 65 parts by weight, and the initiator is present at an amount of 0.1 to 1 parts by weight, more preferably at an amount of 0.5 to 0.7 parts by weight, based on the total amount of the mixture.

Moreover, the mixture further comprises a crosslinking agent, a dye, an UV-blocking agent, a solvent or a combina-

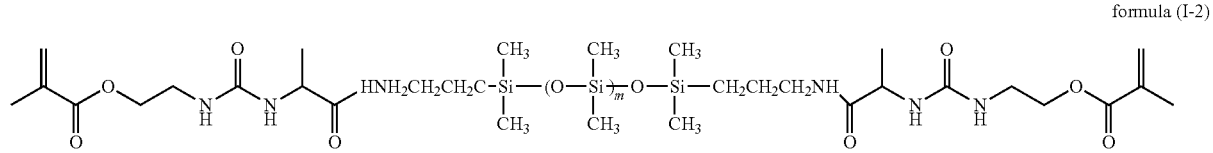

formula (I-2)

wherein m is an integer of 10-100.

In this embodiment, the hydrophilic monomer is a combination of N-vinylpyrrolidone (NVP), 2-hydroxyethyl methacrylate (HEMA) and dimethylaminoethyl methacrylate (DMA) or a combination of N-vinylpyrrolidone (NVP) and 2-hydroxyethyl methacrylate (HEMA).

In further another embodiment of the present invention, the material for manufacturing contact lens comprises a first siloxane macromer represented by the following formula (I-3) and a second siloxane macromer of formula (II) as defined above:

tion thereof. The suitable solvent can be but not limited to, such as, for example, ethanol or 1-hexanol. In the mentioned mixture, the solvent is present at an amount of 0 to 25 parts by weight, more preferably at an amount of 0 to 10 parts by weight.

In the step of (b), the mixture is injected into a mold of contact lens and is cured by a thermal treatment or a UV irradiating treatment to form contact lens.

The thermal treatment can be conducted at a temperature between 60° C. and 120° C. for 1-12 hours. In an embodiment

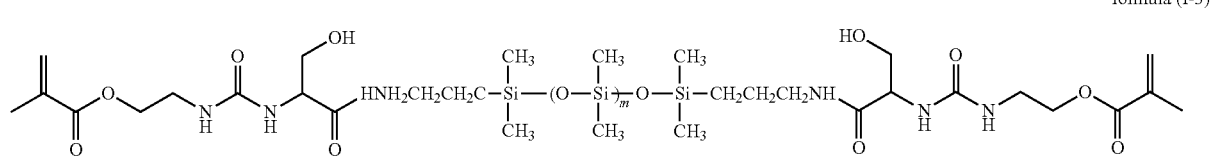

formula (I-3)

wherein m is an integer of 10-100.

In this embodiment, the hydrophilic monomer is a combination of N-vinylpyrrolidone (NVP), 2-hydroxyethyl methacrylate (HEMA) and dimethylaminoethyl methacrylate of the method of the present invention, the thermal treatment is conducted at 80° C. for 10 hours.

After forming the contact lens, the method of the present invention can to further comprise a hydration treatment. In an embodiment of the method of the present invention, the hydration treatment comprises but not limited to the following steps.

Firstly, the contact lens is immersed in a solvent, the suitable solvent can be but not limited to isopropanol or alcohol. And then, the contact lens is immersed in water. After that, the contact lens is immersed in a buffer solution to reach equilibrium, the suitable buffer solution can be but not limited to saline solution.

According to a further another aspect of the present invention, a contact lens obtained by the method mentioned above is provided.

The oxygen permeability (DK) of the contact lens according to the present invention is more than 70, and preferably more than 120. Compared with commercially available contact lenses, the first siloxane macromer with amino acid groups can certainly enhance the oxygen permeability (DK) of the contact lens according to the present invention.

In addition, the water content of the contact lens according to the present invention is greater than 30%. In an embodiment of the present invention, the water content of the contact lens is about 30-60%.

The present invention will be explained in further detail with reference to the examples. However, the present invention is not limited to these examples.

EXAMPLE

Preparation of First Siloxane Macromer (I-1)

formula (I-1)

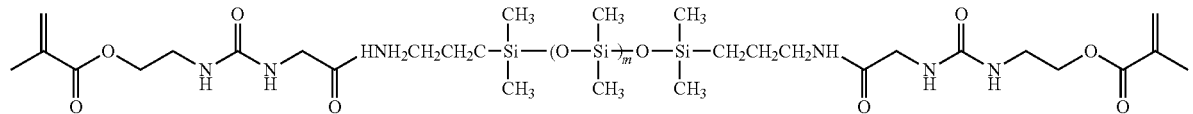

1 g (13.32 mmole) of glycine, 20 ml of water and 2 g (13.32 mmole) of isocyanate were added to a flask and stirred at room temperature. After stirred for 12 hours, the solvent was removed by evaporating to obtain an intermediate compound.

30 g of aminopropyl terminated polydimethylsiloxane (Mn. 4,400), 5 g (13.46 mmol) of O-(Benzotriazol-1-yl)-N,N,N',N'-tetramethyluronium hexafluorophosphate (HBTU) as coupling agent, 100 ml of methylene chloride as solvent and 3 g (13.465 mmol) of the above intermediate compound were added to a flask and stirred at room temperature. After stirred for 12 hours, the resulting reaction product was washed with water, dehydrated by magnesium sulfate and filtered, and then the solvent was removed by evaporating to obtain the first siloxane macromer (I-1), and the number average molecular weight of first siloxane macromer (I-1) was about 4,500.

Preparation of First Siloxane Macromer (I-2)

formula (I-2)

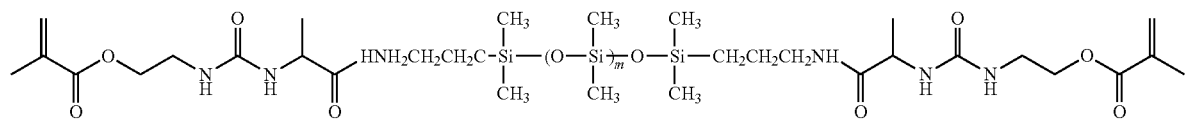

1 g (11.22 mmole) of alanine, 20 ml of water and 1.74 g (11.22 mmole) of isocyanate were added to a flask and stirred at room temperature. After stirred for 12 hours, the solvent was removed by evaporating to obtain an intermediate compound.

30 g of aminopropyl terminated polydimethylsiloxane (Mn. 4,400), 7 g (18.46 mmol) of O-(Benzotriazol-1-yl)-N,N,N',N'-tetramethyluronium hexafluorophosphate (HBTU) as coupling agent, 100 ml of methylene chloride as solvent and 3 g (12.28 mmol) of the above intermediate compound were added to a flask and stirred at room temperature. After stirred for 12 hours, the resulting reaction product was washed with water, dehydrated by magnesium sulfate and filtered, and then the solvent was removed by evaporating to obtain the first siloxane macromer (I-2), and the number average molecular weight of first siloxane macromer (I-2) was about 4,500.

Preparation of First Siloxane Macromer (I-3)

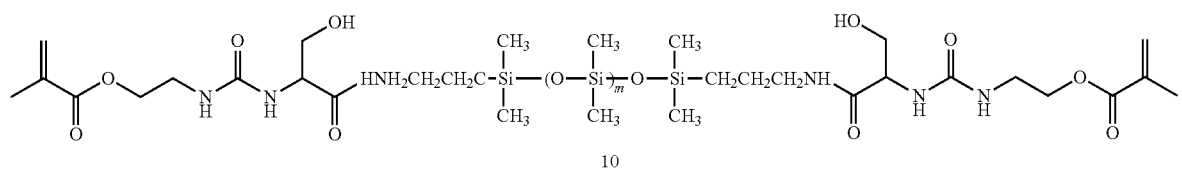

formula (I-1)

1 g (9.51 mmole) of serine, 20 ml of water and 1.47 g (9.51 mmole) of isocyanate were added to a flask and stirred at room temperature. After stirred for 12 hours, the solvent was removed by evaporating to obtain an intermediate compound.

30 g of aminopropyl terminated polydimethylsiloxane (Mn. 4,400), 6.6 g (17.29 mmol) of O-(Benzotriazol-1-yl)-N,N,N',N'-tetramethyluronium hexafluorophosphate (HBTU) as coupling agent, 100 ml of methylene chloride as solvent and 3 g (11.53 mmol) of the above intermediate compound were added to a flask and stirred at room temperature. After stirred for 12 hours, the resulting reaction product was washed with water, dehydrated by magnesium sulfate and filtered, and then the solvent was removed by evaporating to obtain to the first siloxane macromer (I-3), and the number average molecular weight of first siloxane macromer (I-3) was about 4,600.

Preparation of Second Siloxane Macromer

The reaction scheme of second siloxane macromer is shown as follow:

4.44 g of isophorone diisocyanate, 0.0025 g of dibutyltin dilaurate as the catalyst, and 40 ml of methylene chloride were added to a flask, and the solution was stirred under a stream of nitrogen. Then, 20 g of monocarbinol terminated polydimethylsiloxane (Mn. 1,000, available from Gelest) was accurately weighed and added dropwise to the solution over about 1 hour. After the reaction standing at room temperature for 12 hours, another 0.0025 g of dibutyltin dilaurate and 7.2 g of polyethylene glycol monomethacrylate (Mn. 526) were accurately weighed and added dropwise to the solution over about 1 hour. After the reaction is conducted at room temperature for another 12 hours, the resulting reaction product was washed with a large amount of water, and then dehydrated and filtered to obtain the raw product. Then, the methylene chloride was removed by evaporating to obtain second siloxane macromer, and the number average molecular weight of second siloxane macromer was about 1,700.

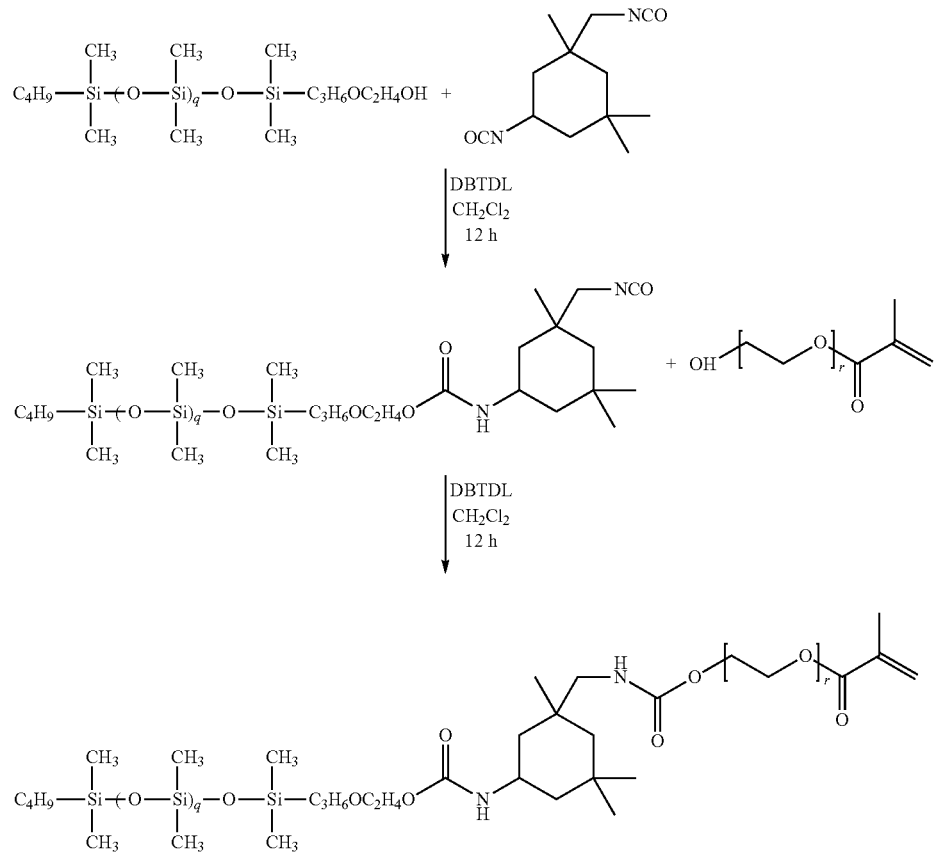

Preparation of Contact Lens

The Preparation of the Contact Lens of Example 1

A first siloxane macrome (I-1), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 2

A first siloxane macrome (I-1), a second siloxane macrome (II), N-vinylpyrrolidone (NVP), 2-hydroxyethyl methacrylate (HEMA), an azobisisoheptonitrile (ADVN) as thermal initiator, and an ethanol as solvent to were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hour, and then immersed in a buffer solution to reach equilibrium.

The Preparation of the Contact Lens of Example 3

A first siloxane macrome (I-1), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 4

A first siloxane macrome (I-1), a second siloxane macrome (II), N-vinylpyrrolidone (NVP), 2-hydroxyethyl methacrylate (HEMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 5

A first siloxane macrome (I-2), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with to lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 6

A first siloxane macrome (I-2), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 7

A first siloxane macrome (I-2), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 8

A first siloxane macrome (I-2), a second siloxane macrome (II), N-vinylpyrrolidone (NVP), 2-hydroxyethyl methacrylate (HEMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 9

A first siloxane macrome (I-2), a second siloxane macrome (II), N-vinylpyrrolidone (NVP), 2-hydroxyethyl methacrylate (HEMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 10

A first siloxane macrome (I-3), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach to equilibrium.

The Preparation of the Contact Lens of Example 11

A first siloxane macrome (I-3), a second siloxane macrome (II), N-vinylpyrrolidone (NVP), 2-hydroxyethyl methacrylate (HEMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 12

A first siloxane macrome (I-3), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at to 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 13

A first siloxane macrome (I-3), a second siloxane macrome (II), N-vinylpyrrolidone (NVP), 2-hydroxyethyl methacrylate (HEMA), N,N'-dimethylacrylamide (DMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 14

A first siloxane macrome (I-3), a second siloxane macrome (II), N-vinylpyrrolidone (NVP), 2-hydroxyethyl methacrylate (HEMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

The Preparation of the Contact Lens of Example 15

A first siloxane macrome (I-3), a second siloxane macrome (II), N-vinylpyrrolidone (NVP), 2-hydroxyethyl methacrylate (HEMA), an azobisisoheptonitrile (ADVN) as thermal initiator, an ethylene glycol dimethacrylate (EGDMA) as crosslinking agent and an ethanol as solvent were mixed at the amounts shown in following Table 1 and stirred about 1 hour to form a mixture.

Then, the mixtures were injected into a mold of contact lens made of polypropylene (PP) and heated to initiate the radical polymerization thereof at 80° C. for 10 hours. After the polymerization was completed, the mold with lens was immersed in isopropanol for 1 hour, and then the resulting molded lens was taken out of the mold. After that, the resulting lens was immersed in heated water for 4 hours, and then immersed in a buffer solution to reach equilibrium.

Physical Property Tests

The results of physical property tests of Comparative Example 1 (PureVision, commercially available from B&L), Comparative Example 2 (Day and night, commercially available from Ciba,) and Example 1-Example 15 of the present invention were shown as the following Table 2.

As shown in Table 2, the contact lens according to the present invention has more excellent oxygen permeability than comparative examples. In addition, the water content of Example 1-Example 15 is about 33-55%.

TABLE 1

The composition of contact lens of Example 1-Example 15

| Composition | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| First siloxane macrome | Formula (I-1) | 30 | 10 | 7 | 8 | | | | | | | | | | | |
| | Formula (I-2) | | | | | 30 | 10 | 5 | 2 | 3 | | | | | | |
| | Formula (I-3) | | | | | | | | | | 30 | 5 | 7 | 6 | 5 | 10 |
| Second siloxane macrome | Formula (II) | 30 | 40 | 50 | 35 | 30 | 45 | 35 | 42 | 45 | 30 | 40 | 38 | 41 | 50 | 38 |
| Hydrophilic monomer | NVP | 15 | 25 | 28 | 40 | 15 | 25 | 35 | 38 | 40 | 15 | 38 | 45 | 40 | 30 | 35 |
| | HEMA | 15 | 25 | 13 | 15 | 15 | 15 | 20 | 15 | 12 | 15 | 15 | 5 | 6 | 11 | 15 |
| | DMA | 10 | | | | 10 | 4 | 5 | | | 10 | | 5 | 4 | | |
| Crosslinking agent | EGDMA | | | 2 | 2 | | 1 | | 3 | | | 2 | | 3 | 4 | 2 |
| Initiator | ADVN | 0.75 | 0.75 | 0.75 | 0.75 | 0.75 | 0.75 | 0.75 | 0.75 | 0.75 | 0.75 | 0.75 | 0.75 | 0.75 | 0.75 | 0.75 |
| Solvent | Ethonal | 10 | 10 | 10 | 10 | 10 | 10 | 10 | 10 | 10 | 10 | 10 | 10 | 10 | 10 | 10 |

TABLE 2

The result of physical property tests

| | Comparative Example | | Example | | | | | | | | | | | | | | |
|---|---|---|---|---|---|---|---|---|---|---|---|---|---|---|---|---|---|
| Item | 1 | 2 | 1 | 2 | 3 | 4 | 5 | 6 | 7 | 8 | 9 | 10 | 11 | 12 | 13 | 14 | 15 |
| Water content (%) | 36 | 24 | 38.5 | 33.6 | 34.6 | 55.3 | 48.8 | 40.1 | 47.5 | 50.1 | 51.1 | 49.8 | 51 | 51.4 | 30.2 | 41.6 | 39.9 |
| Modulus (MPa) | 1 | 1.2 | 0.93 | 0.72 | 0.58 | 0.4 | 0.63 | 0.49 | 0.65 | 0.47 | 0.45 | 0.56 | 0.47 | 0.58 | 0.42 | 0.64 | 0.61 |
| Tension (g) | 103 | 60 | 18 | 34 | 27 | 68 | 18 | 21 | 64 | 57 | 32.3 | 16 | 47 | 37 | 53 | 83 | 37 |
| Oxygen permeability (Dk) | 75 | 84 | 90 | 138 | 156 | 125 | 88 | 95 | 78 | 101 | 106 | 118 | 133 | 94 | 93 | 165 | 144 |

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A material for manufacturing contact lens comprising:
   a first siloxane macromer represented by following formula (I):

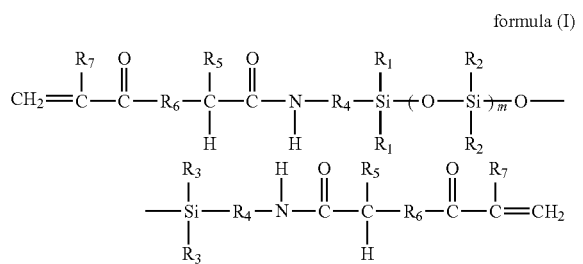

formula (I)

wherein $R_1$, $R_2$ and $R_3$ are independently a $C_1$-$C_{12}$ alkyl group optionally substituted with a hydroxyl group or a $C_1$-$C_{12}$ siloxane group; $R_4$ is a $C_1$-$C_6$ alkylene group or a $C_1$-$C_6$ alkylene group substituted with an ether group; $R_5$ is —H, —$CH_3$, —CH($CH_3$)$_2$, —CH($CH_3$)$CH_2$($CH_3$), —$CH_2CH(CH_3)_2$, —$CH_2C_6H_5$, —$CH_2OH$, —CH(OH)$CH_3$, —$CH_2CONH_2$ or —$CH_2CH_2CONH_2$; $R_6$ is —NHCONH—, —NHCO—, —$R_8$NHCONH— or —$R_8$NHCO— wherein $R_8$ is —O—, —O($CH_2$)$_n$— or —($CH_2$)$_n$— and n is an integer of 1-10; $R_7$ is hydrogen or methyl; and m is an integer of 10-100.

2. The material for manufacturing contact lens according to claim 1, wherein in the formula (I), $R_1$, $R_2$ and $R_3$ are methyl, $R_4$ is a $C_3$ alkylene group, $R_5$ is -H, $R_6$ is —OC$_2$H$_4$NHCONH— and $R_7$ is methyl.

3. The material for manufacturing contact lens according to claim 1, wherein in the formula (I), $R_1$, $R_2$ and $R_3$ are methyl, $R_4$ is a $C_3$ alkylene group, $R_5$ is —$CH_3$, $R_6$ is —OC$_2$H$_4$NHCONH— and $R_7$ is methyl.

4. The material for manufacturing contact lens according to claim 1, wherein in the formula (I), $R_1$, $R_2$ and $R_3$ are methyl, $R_4$ is a $C_3$ alkylene group, $R_5$ is —$CH_2OH$, $R_6$ is —OC$_2$H$_4$NHCONH— and $R_7$ is methyl.

5. The material for manufacturing contact lens according to claim 1 further comprising a second siloxane macromer represented by the following formula (II):

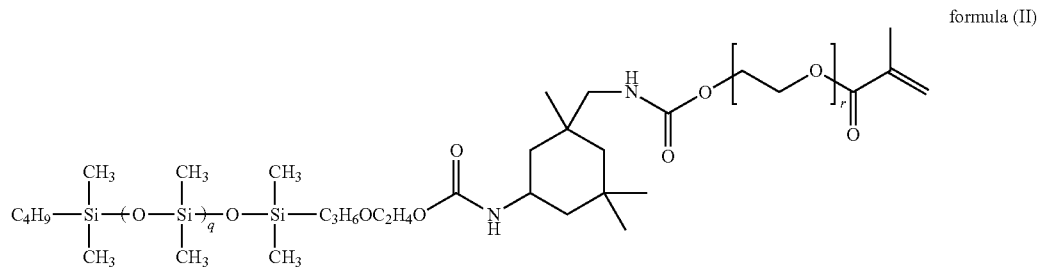

wherein q is an integer of 4-80 and r is an integer of 3-40;
at least a hydrophilic monomer; and
an initiator.

6. The material for manufacturing contact lens according to claim 5, wherein, based on the total amount of the material, the first siloxane monomer is present at an amount of 3 to 50 parts by weight, the second siloxane monomer is present at an amount of 30 to 70 parts by weight, the hydrophilic monomer is present at an amount of 20 to 70 parts by weight and the initiator is present at an amount of 0.1 to 1 parts by weight.

7. The material for manufacturing contact lens according to claim 5, wherein the hydrophilic monomer is one selected from the group consisting of N-vinylpyrrolidone (NVP), 2-hydroxyethyl methacrylate (HEMA), N,N'-dimethylacrylamide (DMA), methyl acrylic acid (MAA), N,N-diethylacrylamide, N-isopropylacrlamide, 2-hydroxyethyl acrylate, vinyl acetate, N-acryloymorpholine, 2-dimethlaminoethyi acrylate and a combination thereof.

8. The material for manufacturing contact lens according to claim 5, wherein the initiator is a thermal initiator or a photoinitiator.

9. The material for manufacturing contact lens according to claim 1 further comprising a crosslinking agent, a dye, an UV-blocking agent, a solvent or a combination thereof.

10. The material for manufacturing contact lens according to claim 9, wherein the crosslinking agent is selected from a group consisting of ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly (ethylene glycol) dimethacrylate, trimethylolpropane trimethacrylate, vinyl methacrylate, ethylenediamine dimethyl acrylamide, glycerol dimethacrylate, triallyl isocyanurate and triallyl cyanurate.

11. A method for manufacturing contact lens comprising:
(a) mixing a first siloxane macromer represented by the following formula (I):

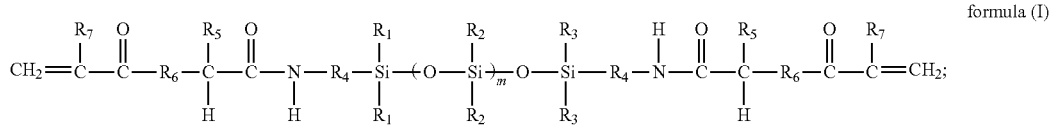

wherein $R_1$, $R_2$ and $R_3$ are independently a $C_1$-$C_{12}$ alkyl group optionally substituted with a hydroxyl group or a $C_1$-$C_{12}$ siloxane group; $R_4$ is a $C_1$—$C_6$ alkylene group or a $C_1$—$C_6$ alkylene group substituted with wiether group; $R_5$ is —H, —CH$_3$, —CH(CH$_3$)$_2$, —CH(CH$_3$)CH$_2$(CH$_3$), —CH$_2$CH(CH$_3$)$_2$, —CH$_2$C$_6$H$_6$, —CH$_2$OH, —CH(OH)CH$_3$, —CH$_2$CONH$_2$ or —CH$_2$CH$_2$CONH$_2$; $R_6$ is —NHCONH—, —NHCO—, —R$_8$NHCONH— or —R$_8$NHCO—, wherein $R_8$ is —O—, —O(CH$_2$)$_n$— or —(CH$_2$)$_n$— and n is an integer of 1-10; R7 is hydrogen or methyl; and m is an integer of 10-100;
a second siloxane macromer represented by the following formula (II),

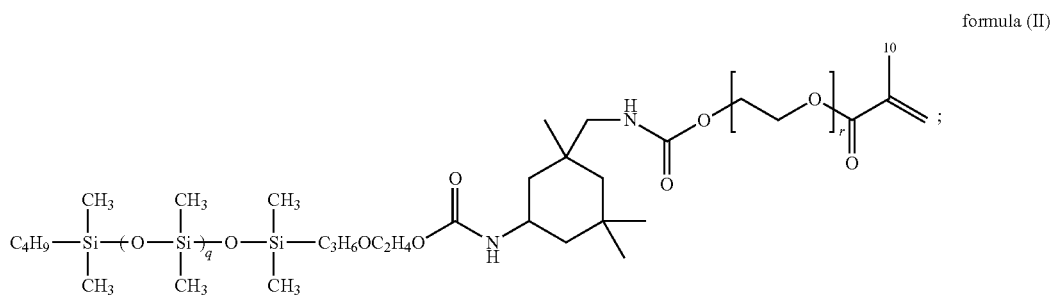

wherein q is an integer of 4-80 and r is an integer of 3-40;
at least a hydrophilic monomer and an initiator to form a mixture; and
(b) injecting the mixture into a mold of contact lens and conducting a thermal treatment or a UV irradiating treatment to form contact lens.

12. A method for manufacturing contact lens according to claim 11, wherein in the formula (I), $R_1$, $R_2$ and $R_3$ are methyl, $R_4$ is a $C_3$ alkylene group, $R_5$ is —H, $R_6$ is —$OC_2H_4NHCONH$— and $R_7$ is methyl.

13. A method for manufacturing contact lens according to claim 11, wherein in the formula (I), $R_1$, $R_2$ and $R_3$ are methyl, $R_4$ is a $C_3$ alkylene group, $R_5$ is —$CH_3$, $R_6$ is —$OC_2H_4NHCONH$— and $R_7$ is methyl.

14. A method for manufacturing contact lens according to claim 11, wherein in the formula (I), $R_1$, $R_2$ and $R_3$ are methyl, $R_4$ is a $C_3$ alkylene group $R_5$ is —$CH_2OH$, $R_6$ is —$OC_2H_4NHCONH$— and $R_7$ is methyl.

15. A method for manufacturing contact lens according to claim 11, wherein the hydrophilic monomer is one selected from the group consisting of N-vinylpyrrolidone (NVP), 2-hydroxyethyl methacrylate (HEMA), N,N'-dimethylacrylamide (DMA), methyl acrylic acid (MAA), N,N-diethylacrylamide, N-isopropylacrlamide, 2-hydroxyethyl acrylate, vinyl acetate, N-acryloymorpholine, 2-dimethlaminoethyl acrylate and a combination thereof.

16. A method for manufacturing contact lens according to claim 11, wherein, based on the total amount of the mixture, the first siloxane monomer is present at an amount of 3 to 50 parts by weight, the second siloxane monomer is present at an amount of 30 to 70 parts by weight, the hydrophilic monomer is present at an amount of 20 to 70 parts by weight and the initiator is present at an amount of 0.1 to 1 parts by weight.

17. A method for manufacturing contact lens according to claim 11, wherein the initiator is a thermal initiator or a photoinitiator.

18. A method for manufacturing contact lens according to claim 11, wherein the mixture further comprising a crosslinking agent, a dye, an UV-blocking agent, a solvent or a combination thereof.

19. A method for manufacturing contact lens according to claim 11, wherein the crosslinking agent is selected from a group consisting of ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly (ethylene glycol) dimethacrylate, trimethylolpropane trimethacrylate, vinyl methacrylate, ethylenediamine dimethyl acrylamide, glycerol dimethacrylate, triallyl isocyanurate and triallyl cyanurate.

20. A contact lens which is obtained by the method for manufacturing contact lens according to claim 11.

* * * * *